United States Patent [19]

Saran, deceased et al.

[11] Patent Number: 4,457,858

[45] Date of Patent: Jul. 3, 1984

[54] METHOD OF MAKING COATED GRANULAR BLEACH ACTIVATORS BY SPRAY DRYING

[75] Inventors: Herbert Saran, deceased, late of Düsseldorf, Fed. Rep. of Germany, by Karin Saran, née Müller, executor; Martin Witthaus, Düsseldorf, Fed. Rep. of Germany

[73] Assignee: Henkel Kommanditgesellschaft auf Aktien, Düsseldorf, Fed. Rep. of Germany

[21] Appl. No.: 396,149

[22] Filed: Jul. 7, 1982

[30] Foreign Application Priority Data

Jul. 17, 1981 [DE] Fed. Rep. of Germany ....... 3128336

[51] Int. Cl.$^3$ ............ C09K 3/00

[52] U.S. Cl. ............ 252/182; 252/99; 252/102; 252/186.38

[58] Field of Search ............ 252/99, 102, 186.38, 252/182

[56] References Cited

U.S. PATENT DOCUMENTS

| | | | |
|---|---|---|---|
| 3,163,606 | 12/1964 | Viveen et al. | 252/99 |
| 3,177,148 | 4/1965 | Bright et al. | 252/99 |
| 3,715,184 | 2/1973 | Kuhling et al. | 252/99 X |
| 3,775,332 | 11/1973 | Heins et al. | 252/99 X |
| 3,789,002 | 1/1974 | Weber et al. | 252/186.38 X |
| 3,833,506 | 9/1974 | Fries et al. | 252/99 |
| 3,901,819 | 8/1975 | Nakagawa et al. | 252/186.38 X |
| 3,925,234 | 12/1975 | Hachmann et al. | 252/102 X |
| 3,982,892 | 9/1976 | Gray | 252/186.38 X |
| 4,003,841 | 1/1977 | Hachmann et al. | 252/186.38 X |
| 4,009,113 | 2/1977 | Green et al. | 252/102 X |
| 4,372,868 | 2/1983 | Saran et al. | 252/99 X |

*Primary Examiner*—Benjamin R. Padgett
*Assistant Examiner*—Matthew A. Thexton
*Attorney, Agent, or Firm*—Ernest G. Szoke; Henry E. Millson, Jr.

[57] ABSTRACT

Coated granular bleach activators and a process for their preparation comprising spray drying an aqueous slurry containing 1 to 1.7 parts by weight of water per part of a mixtue of (A) a powdery bleach activator and (B) at least one water soluble cellulose ether, starch, or starch ether in a ratio of A:B of from 99:1 to 90:10. The process utilizes a current of a drying gas having an entrance temperature of 100°-200° C. and an exit temperature of 40°-120° C.

20 Claims, No Drawings

METHOD OF MAKING COATED GRANULAR BLEACH ACTIVATORS BY SPRAY DRYING

BACKGROUND OF THE INVENTION

Bleach activators are understood to be compounds that react with hydrogen peroxide or perhydrates in aqueous solution to form peracids that act as a bleach. Compounds that are especially effective as bleach activators are N-acylated amines, amides, and glycolurils, which are disclosed in German Patent Applications DE No. 11 62 967, DE No. 12 91 317, DE No. 20 38 106, and DE No. 15 94 865. German Patent Application DE No. 11 62 967 suggests that these bleach activators should be coated with a water soluble coating prior to use in detergents and bleaching agents; and that the coating material can consist of carboxymethyl cellulose. This coating material can be dissolved in water in a finely dispersed form, and sprayed onto the activator, followed by drying of the coated activator. This patent recommends granulating the activator prior to coating; however, no instructions are given as to how to granulate or what granulating devices should be used. If one follows the outline of DE No. 11 62 967, and sprays such a bleach activator, e.g. tetraacetylethylenediamine, with an aqueous carboxymethyl cellulose solution in a granulator, problems will arise. The reason for this is that aqueous solutions containing more than 5 wt. % of carboxylmethyl cellulose cannot be handled properly by commercial granulation processes due to their high viscosity and gelatinous consistency. In order to be able to apply a sufficiently heavy coating on the activator particles, large amounts of dilute cellulose ether solutions must be used. As disclosed in Example 10 of German Patent Application DE No. 11 62 967, 18 wt. % carboxymethyl cellulose must be applied onto the bleach activator. When taking into consideration the fact that due to its high viscosity, a 5% solution thereof is just barely usable, the use of 18 wt. % carboxymethyl cellulose means that 360 wt. % (in relation to the amount of activator) of a 5% cellulose ether solution is required. It can be demonstrated that when using more than 20 to 30 Wt. % of such solution, the resulting mixture turns into a lumpy to paste-like material instead of useable granulates. It is therefore suggested in column 3 of German Patent Application DE No. 11 62 967 to use alcohol solutions of the carboxymethyl cellulose. However, this requires the installation of expensive and explosion proof equipment; and in addition, high costs ensue when reclaiming the solvent. Such a process, therefore, cannot be used for commercial purposes. Identical problems arise if instead of a cellulose ether solution, fatty acids, fatty acid alkanolamides, fatty alcohols, and carbowaxes dissolved in organic solvents are used as coating materials, as is also suggested in DE No. 11 62 967. An additional disadvantage is also that such coating materials do not dissolve, or dissolve only very slowly, in bleaching solutions and, therefore, the desired cold bleach effect is suppressed.

As is disclosed in German Patent Application DE No. 20 48 331, a process for the manufacture of coated, granular bleach activators is known where the activator is mixed dry with materials suitable for coating or granulating. During the second step of this process, spraying and granulating is achieved with granulating adjuvants or film formers dissolved in water. In order to obtain dry pre-mixes, it is suggested that either water soluble builder salts used in detergents that bind water as water of crystallization, e.g. phosphates, polyphosphates, carbonates, and silicates of alkali metals, or water insoluble fillers such as silicic acid, magnesium silicate or magnesium oxide be used. The same water soluble salts that bind water as water of crystallization can also be used for granulating adjuvants; or if the dry premixes are sprayed with an aqueous solution of coating forming materials such as cellulose derivatives or other water soluble polymers of natural or synthetic origin, they will granulate at the same time. This process, however, can only be used for granules with a low content of bleach activators, i.e. it is only useable for granules containing less than 50 wt. % bleach activators. The granules, therefore, are only suitable for uses where a high amount of admixturing agents will not interfere with their efficiency.

The prior art processes for coating bleach activators are all restricted to granulation processes. The usual granulation processes, however, suffer from non-uniform grain sizes. After the granulation and drying processes are completed, coarse grains and dust must be eliminated by a screening process. If the coarse grains are then ground to the desired grain size, and then added to the finished granulate, the ground mixture would have a short shelf life because the bleach activator granules will either not be protected at all or will be insufficiently protected in locii where fracturing had occurred. This means that one has to process by granulating not only the finished product itself but also the ground coarse granules, requiring the recycling of a considerable quantity of materials.

From German Patent Applications DE No. 21 38 584 and DE No. 22 07 974, methods for the manufacture of coated bleach activators are known; e.g., melted mixtures of polyglycol and fatty acids containing dispersed bleach activators are sprayed in a spray tower by means of nozzles or rotating disks, and the formed droplets are solidified by cool air. The bleach activator is very well protected against decomposition in the prills that result from this process. However, problems can occur during application because these prills will only completely dissolve above their melting point. Additions of fatty alcohols or their ethoxylates and sulfates, as described in German Patent Applications DE No. 23 38 412 and DE No. 25 35 731, only produce partial improvement of this solubility problem. Prills not dissolved at low temperatures can adhere to textiles during the laundry process, and can dissolve into small greasy spots during subsequent hot air drying or ironing. Finally, this process also causes problems during the hot summer days if insufficiently cool air is available for cooling and solidifying the prills. Pre-cooling of the air used in the spray tower is rather expensive.

The above mentioned granulating and spray processes have in common that they must be carried out at relatively low temperatures. Due to the known thermal sensitivity of the bleach activators, it was assumed until now that the bleach activators cannot be exposed to high temperature spray drying.

DETAILED DESCRIPTION OF THE INVENTION

The present invention relates to a process for the commercial manufacture of granular bleach activators and to the granular bleach activators prepared therefrom.

The process of the invention is carried out by first forming an aqueous slurry capable of being pumped of the following composition:

from about 1 to about 1.7 parts by weight, preferably from about 1.3 to about 1.5 parts by weight of water per 1 part by weight of a mixture which contains:

(A) a bleach activator in powder form;

(B) at least one compound from the group of water soluble cellulose ethers, starches, and starch ethers; and optionally, (C) one or more constituents that will remain stable in contact with bleach activators under the spray-dry conditions of the present process and which will improve the properties of detergents when mixed therewith.

In the above mixture, the weight ratio of (A) to (B) is from about 99:1 to about 90:10, preferably from about 97:3 to about 93:7. The aqueous slurry is then sprayed into a drying chamber with a drying gas flowing through the chamber at an entrance temperature of from about 100° to about 200° C., and an exit temperature of from about 40° to about 120° C. The gas flow can be parallel to, or preferably counter-current to, the direction of spray. The hot gas dries the sprayed product to a moisture content of 3% by weight or less.

The aqueous slurry of the invention is normally prepared by starting with a solution or mixture of the cellulose ether, starch, or starch ether with the water used to form the slurry, and then mixing in the powdery bleach activator.

Examples of cellulose ethers that can be employed as a compound of component (B) above are methyl cellulose, ethyl cellulose, hydroxyethyl cellulose, methyl hydroxyethyl cellulose, methyl hydroxypropyl cellulose, carboxymethyl cellulose (as the sodium salt) and methyl carboxymethyl cellulose (as the sodium salt). As starches, depolymerized starches can be employed. Suitable starch ethers are carboxymethyl starches, hydroxyethyl starches, and methyl starches. Especially suitable for use in the practice of the invention is sodium carboxymethyl cellulose.

As bleaching activators as component (A) above, these can be used the known N-acylated amines, diamines, amides, and glycourils, as disclosed in the prior art patent applications listed above. These include tetraacetyl methylenediamine, tetraacetylethylenediamine, diacetylaniline, diacetyl-p-toluidine, 1,3-diacetyl-5,5-dimethylhydantoin tetraacetyl glycoluril, tetrapropionylglycoluril, 1,4-diacetyl-2,5-diketopiperazine, and 1,4-diacetyl-3,6-dimethyl-2,5-diketopiperazine. Preferred is tetraacetylethylenediamine as the bleach activator in the practice of the invention.

The bleach activator should have the following approximate grain size distribution as determined by a sieve analysis:

0 wt. % over 1.5 mm
10–50, preferably 15–40 wt. % with 1.5–0.2 mm
15–60, preferably 20–50 wt. % with 0.2–0.09 mm
5–50, preferably 10–40 wt. % with 0.09–0.03 mm up to 30 wt. % under 0.03 mm.

The grain size weight percent distribution is determined using an air classifier in order to avoid errors based on the clumping together of very small particles due to their electrostatic charges. Bleach activators whose grain size distribution is within the ranges given above will yield products with especially good powder and storage properties as well as higher rates of solubility in cold water.

With respect to the weight ratio of bleach activator (component A) to cellulose or starch ethers or starch (component B), and the ratio of water to the sum of solid materials in the slurry, the proportions thereof must be selected in such a way that the aqueous slurry can still be pumped or sprayed even when heated. This means that slurrys containing larger amounts of component (B) will require larger amounts of water than those containing smaller amounts of component (B).

The constituents that can optionally be added to the aqueous slurry as component (C) above, i.e. substances that will remain stable in the presence of bleach activators under the spray-dry conditions of the invention as well as improve the properties of detergents when mixed with them, include polyglycols and nonionic surfactants, especially linear compounds such as saturated and unsaturated fatty alcohol polyglycolethers, or methyl-branched fatty alcohol, viz. oxoalcohol, polyglycol ethers. These fatty alcohol polyglycol ethers have an average of 4 to 25 glycol ether groups. Equivalent nonionic surfactants are the polyglycol ether derivatives of alkylphenols, alkylamines, thioalcohols, fatty acids and fatty acid amides. The amount of such additives can amount to up to 10 wt. %, e.g. 1 to 5 wt. % of the weight of the dried spray product. Such additives reduce the tendency toward dust formation. Furthermore, there can be added coloring agents and pigments; silicic acid as a powder, especially microfine silicic acid; fine particles of zeolite; phosphates such as sodium tripolyphosphate; and neutral salts such a sodium sulfate. The amount of such materials present should be kept small in relation to the dried product in order not to lessen the advantages of this process, namely the availability of a product with a high active ingredient content. In instances where the manufactured products are mixed immediately with a detergent, the addition of materials important for improved laundering action can be much greater, e.g., up to 50 wt. % of the dried spray product.

It is also possible to add to the slurry prior to spray drying as optional components (C) such materials which are usually added separately to detergent compositions in very small amounts by a special mixing process. This is the case when the granular compounds of this invention are intended for use in detergents and in laundering processes. These materials are additives which become deactivated during normal hot spray drying of a detergent slurry, such as foam inhibitors. Such foam inhibitors are known defoaming agents, preferably organopolysiloxanes and their mixtures with microfine silicic acid. Examples are polydimethylsiloxane with a content of about 1–10 wt. % microfine silicic acid. The amount of such polysiloxane defoamers can be in the range of about 0.5 to about 5 wt. %, preferably about 1 to about 4 wt. %, in relation to the weight of the final spray product. The addition of a defoamer to the aqueous slurry is made after component (B) above is either dissolved or swelled in the water used to form the slurry in order to avoid creaming of the silicone solution. When using organopolysiloxanes, the addition of surfactants to the aqueous slurry is avoided in order to prevent a decrease in effectiveness of the foam inhibiting properties thereof.

Spray-drying of the slurrys of the invention is accomplished in regular drying chambers using hot air or flue gases. Preferably, cylindrical towers are used where the hot gases enter on a tangent in the lower section of the tower. The preferred entry temperature is about 120° to about 150° C., and the exit temperature at the top of the tower is about 50° to about 85° C. From there the hot gas is channelled to a dust removing installation. The aqueous slurrys ready for drying are channelled over high pressure lines to the top of the drying tower and sprayed by means of spray nozzles of which usually several nozzles are arranged in a circular configuration. In place of high pressure spray nozzles, rotating disks can also be used. It is also possible to have the drying gases flow in a parallel flow, namely have the gas enter at the top of the tower, and exit at the bottom of the tower. The spray-dried material can be removed from the bottom of the tower by a screw conveyer or by a rotary gate.

When the dried material leaves the tower, it will not contain more than 3 wt. % water, preferably about 0.5 to about 2% water. Water or water of crystallization in compounds optionally added under component (C) above is not included in this figure.

It was very surprising to discover that the bleach activators which are normally very heat sensitive remained stable under the selected spray conditions of the process of the invention. One important advantage of the present process is that dust formation or oversized particles are insignificant; the sprayed material exhibits a very uniform grain size spectrum of 0.2 to 2 mm, with 70 to 90 wt. % falling within the desired grain size range of 0.4 to 1.6 mm. Products with such a grain size distribution are especially useful for addition to spray-dried detergents, which usually have a similar grain distribution. Hence, the resulting mixtures will normally not separate during transport. When using such granular detergents where a perborate is the bleach component selected, the bleach activators prepared by the process of the invention exhibit unusually high storage stability.

The invention will be better understood from the following examples which are given for illustration purposes only.

In the following examples, the abbreviations used therein have the following meanings:

TAED=tetraacetylethylenediamine
TAGU=tetraacetylglycoluril
CMC=carboxymethyl cellulose, Na-salt
EO=ethyleneglycol ether groups

EXAMPLE 1

To a solution consisting of
5 parts by weight CMC in
140 parts by weight of water,
there was added
94.03 parts by weight TAED powder, and
0.07 parts by weight of a blue coloring agent, and the resulting mixture was stirred for 20 minutes to form a stable slurry. This slurry was then sprayed through nozzles in a spray tower at a 1.5 t/h rate with tangential introduction of dry air in counter current flow. The entrance temperature of the air was 150° C., and the exit temperature 70° C. When the product left the floor of the tower it had a temperature of 70° C., and had a residual moisture content of 1.0 wt. %. The fine particles under 0.4 mm as well as coarse particles over 1.6 mm were removed by sifting, and returned to the next slurry make-up. The yield of granulates with a grain spectrum of 0.4 to 1.6 mm was 79.8 wt. %. The product was homogeneous, free flowing, and contained the theoretical amount of TAED; indicating the absence of any decomposition.

A mixture of the above TAED product (4 parts by weight) with a spray-dried detergent powder containing additionally 20% by weight of sodium perborate proved to be stable during a 4 weeks storage period at 20° C. and 80% relative air humidity. Moreover, the above TAED product could be dissolved with stirring within less than 2 minutes in water of 30° C. temperature.

EXAMPLE 2

Using the process described in EXAMPLE 1, a slurry was prepared consisting of
96 parts by weight TAED
4 parts by weight CMC and
130 parts by weight water.

The resulting slurry was processed at a 2 t/h rate in a drying tower. The entrance temperature of the counter current air flow was 160° C. and the exit temperature was 80° C. The residual water content in the sprayed product was 0.5 weight-%. The amount of the 0.4 to 1.6 mm sifted fraction was 75 wt. %. With respect to solubility and storage properties the product prepared in this example was very similar to that of EXAMPLE 1.

EXAMPLE 3

The process of EXAMPLE 2 was repeated except that 2 parts by weight of TAED were replaced by a foam inhibiting polydimethylsiloxane ($SiO_2$-content about 4%). The amount of sifted fraction between 0.4 and 1.6 mm increased to 76 wt. %. As far as the powder storage, and solubility properties are concerned the product of this example was similar to that of EXAMPLE 1. When used as a mixed-in constituent (2.50% by weight) for a household detergent of conventional composition containing sodium perborate but no foam-inhibiting agent (silicone content of the mixture 0.05 wt. %), the TAED product of this example exhibited not only bleach enhancing properties but also proved to be an effective foam suppressant by preventing excessive foaming and overflow of the wash liquor in a drum-type washing machine.

EXAMPLE 4

To a solution of
5.0 parts by weight CMC in
130 parts by weight of water,
there was added
89.95 parts by weight TAED,
0.05 parts by weight blueing agent, and
5.0 parts by weight tallow fatty alcohol +50 EO.

A slurry was obtained within 15 minutes mixing time which was dried at a 1.5 t/h rate using the counter current air flow and nozzles in a spray tower. The entrance temperature of the air was 135° C., and the exit temperature 68° C. The residual moisture content was 1.5 wt. %. The yield of the sifted fraction between 0.4 and 0.6 mm was 80.8 wt. %. The product was free flowing, stable during storage, and readily soluble in cold water.

EXAMPLE 5

The process of EXAMPLE 4 was repeated using the same conditions and quantities of ingredients except that TAED was replaced with TAGU. The amount of sifted fraction between 0.4 and 1.6 mm was 78.5 wt. %. All the other properties of the sprayed product were the same as those of the product of EXAMPLE 4.

The bleach activator products prepared by the processes of EXAMPLES 1 through 5 had the following grain size distribution as determined by a sieve analysis using an air jet sieve (Alpine) (results given in wt. %):

| | Example # | | |
|---|---|---|---|
| Mesh Size | 1,2 | 3,4 | 5 |
| Over 1.5 mm | 0 | 0 | 0 |
| 1.5-0.2 mm | 20 | 30 | 26 |
| 0.2-0.09 mm | 33 | 36 | 42 |
| 0.09-0.03 mm | 35 | 16 | 24 |
| Under 0.03 mm | 12 | 18 | 8 |

What is claimed is:

1. A process for the preparation of a bleach activator in granular form comprising the steps of (a) forming an aqueous slurry comprising (A) a bleach activator in powder form, and (B) at least one compound selected from the group consisting of water soluble cellulose ethers, starches, and starch ethers, wherein the slurry contains from about 1 to about 1.7 parts by weight of water per 1 part by weight of the combined nonaqueous ingredients in the slurry, wherein the weight ratio of (A) to (B) is from about 99:1 to about 90:10; and (b) spraying said slurry into a drying chamber wherein the drying gas has an initial contact temperature of from about 100° to about 200° C. to form a granulated bleach activator product having a water content of not more than about 3% by weight.

2. A process in accordance with claim 1 wherein the bleach activator in (A) is selected from the group consisting of N-acylated amines, N-acylated diamines, N-acylated amides, and N-acylated glycourils.

3. A process in accordance with claim 2 wherein the bleach activator is tetraacetylethylenediamine.

4. A process in accordance with claim 1 wherein the compound in (B) is at least one compound selected from the group consisting of methyl cellulose, ethyl cellulose, hydroxyethyl cellulose, methyl hydroxyethyl cellulose, methyl hydroxypropyl cellulose, the sodium salt of carboxymethyl cellulose, or of methyl carboxymethyl cellulose, depolymerized starch, carboxymethyl starch, hydroxyethyl starch, and methyl starch.

5. A process in accordance with claim 4 wherein the compound in (B) is the sodium salt of carboxymethyl cellulose.

6. A process in accordance with claim 1 wherein the weight ratio of (A) to (B) is from about 97:3 to about 93:7.

7. A process in accordance with claim 1 wherein said slurry is formed by first mixing together the water and component (B), followed by mixing component (A) therewith.

8. A process in accordance with claim 1 wherein from about 1.3 to about 1.5 parts by weight of water per 1 part by weight of combined nonaqueous ingredients is present in the slurry.

9. A process in accordance with claim 1 wherein said gas in step (b) has an initial contact temperature of from about 120° to about 150° C.

10. A process in accordance with claim 1 wherein said drying gas is either air or flue gas.

11. A process in accordance with claim 1 wherein step (b) is carried out by spraying the slurry from spray nozzles at the top of a drying tower.

12. A process in accordance with claim 11 wherein the drying gas is introduced into the lower section of the drying tower.

13. A process in accordance with claim 11 or 12 wherein the drying gas exits at the top of the drying tower at a temperature of from about 40° to about 120° C.

14. A process in accordance with claim 1 wherein the granulated bleach activator product has a water content of from about 0.5% to about 2%.

15. A process in accordance with claim 1 wherein the particle size range of the product is as follows:

0 wt. % over 1.5 mm
10-50 wt. % of 1.5-0.2 mm
15-60 wt. % of 0.2-0.09 mm
5-50 wt. % of 0.09 to 0.03 mm
up to 30 wt. % under 0.03 mm.

16. A process in accordance with claim 1 wherein the particle size range of the product is as follows:

0 wt. % over 1.5 mm
15-40 wt. % of 1.5-0.2 mm
20-50 wt. % of 0.2-0.09 mm
10-40 wt. % of 0.09 to 0.03 mm
up to 30 wt. % under 0.03 mm.

17. A process in accordance with claim 1 wherein the slurry in (a) also contains one or more constituents that will remain stable in contact with the bleach activator (A) under the process conditions set forth in claim 1 and which will improve the properties of detergents when mixed therewith.

18. A process in accordance with claim 17 wherein the slurry contains at least one of the following constituents:

(i) a polyglycol
(ii) a nonionic surfactant (iii) a coloring agent
(iv) silicic acid
(v) finely divided zeolite
(vi) a phosphate
(vii) a neutral salt, and
(viii) a foam inhibitor.

19. A process in accordance with claim 17 or 18 wherein from about 0.5 to about 5 wt. %, based on solids content of the slurry, of a foam inhibiting organopolysiloxane is added to the slurry.

20. A process in accordance with claim 17 or 18 wherein up to about 10 wt. %, based on the solids content of the slurry, of at least one nonionic surfactant is added to the slurry.

* * * * *